Patented Dec. 7, 1948

2,455,776

UNITED STATES PATENT OFFICE 2,455,776

HALOGENATED PYRAN COMPOUNDS AND PRODUCTION THEREOF

David Gwyn Jones and John George Mackay Bremner, Norton-on-Tees, England, assignors to Imperial Chemical Industries Limited, a corporation of Great Britain No Drawing. Application July 11, 1946, Serial No. 682,922. In Great Britain July 11, 1945

9 Claims. (Cl. 260—333)

This invention relates to the preparation of halogenated pyran compounds.

We have found that 2,3-dihydropyran and substitution derivatives thereof react with bromine or chlorine and a hydroxyl-containing organic compound ROH or such a compound in which the hydrogen of the hydroxyl group is replaced by an alkali metal to form respectively a compound of the formula (wherein X represents bromine or chlorine and R is an aliphatic alicyclic, aromatic or heterocyclic group)

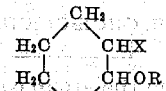

and substitution derivatives thereof. Examples of substituent groups are: hydrocarbon, carbonyl, carboxyl, carboxylic ester, particularly aliphatic monocarboxylic ester, halogen and ether groups.

The reaction proceeds smoothly at atmospheric temperature and pressure but higher temperatures and pressures may be used if desired. With chlorine further substitution may take place if the temperature becomes too high, and it is therefore preferred to operate at temperatures not much in excess of 100° C. The reactants are employed in stoichiometric proportions, but an excess of the halogen may sometimes be used. It is frequently convenient to employ an excess of the hydroxyl containing compound. The reaction may be illustrated by the equation:

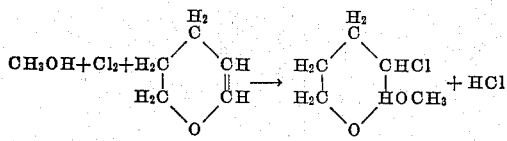

It is advantageous to conduct the reaction in the presence of a basic substance, e. g. sodium carbonate or calcium carbonate in order to neutralise the hydrogen halide formed during the reaction, which would promote a side reaction. If a good yield of the desired substance is to be obtained a basic substance should be present. A sufficient amount of the basic substance should be present to keep the reaction mixture always alkaline.

Instead of chlorine or bromine compounds such as for example, tertiary butyl hypochlorite or bromonitro-methane, which yield halogen under the conditions of the reaction, may be used, and instead of a hydroxyl containing compound there may be used metal alcoholates, such as for example sodium methoxide.

The reaction may be carried out in the presence of water, but it is preferable to work under substantially anhydrous conditions.

An organic solvent which is substantially inert to chlorine and/or bromine may be employed, and is preferably present when the hydroxyl-containing compound is a higher alcohol. Examples of suitable solvents are: tetrahydropyran, chloroform, and saturated chlorhydrocarbons.

The organic hydroxyl-containing compound may be mono- or dy-hydric. Examples of suitable compounds are: the aliphatic mono-alcohols, particularly those containing up to 6 carbon atoms; phenol; tetrahydrofurfuryl alcohol; and furfuryl alcohol. If desired an excess of the hydroxyl-containing compound may be employed.

By the process of the invention there can be obtained the following which are all believed to be new tetrahydropyran derivatives: 2-methoxy-3-chlortetrahydropyran from dihydropyran and methanol; 2 - methoxy-3-brom 3 - carbmethoxy-tetrahydropyran from the methyl ester of 2,3-dihydropyran-5-carboxylic acid and methanol; 2-methoxy-3, 3-dichlor tetrahydropyran from chlordihydropyran and methanol; and 5-methyl, 2-methoxy-3-chlortetrahydropyran from methyl dihydropyran and methanol. Of these 2-methoxy-3-chlortetrahydropyran has a B. P. of 38–40° C./2 mm. and R. I. $n_D^{20}$ 1.4576; and 2-methoxy-3,3-dichlortetrahydropyran has a B. P. of 40–42° C./2 mm.

These new tetrahydropyran derivatives may be represented by the following structural formula:

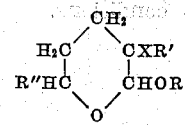

wherein R is a radical from the group consisting of —CH$_3$, —C$_6$H$_5$,

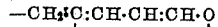

and

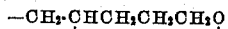

R' is a radical from the group consisting of —Br, —Cl, and —COOCH$_3$; R'' is a radical from the group consisting of —H and —CH$_3$, and X is a radical from the group consisting of —Br and —Cl.

The invention is illustrated but not limited by the following examples.

Example 1

16.8 grams of dihydropyran was dissolved in 280 ccs. methanol and the solution was stirred with 40 grams calcium carbonate while 4.5 litres at normal temperature and pressure of chlorine were added, the temperature of the reaction mixture being below 10° C.

2-methoxy-3-chlortetrahydropyran was obtained as a reaction product.

Example 2

19.7 grams of chlordihydropyran and 30 grams of sodium carbonate were stirred in 75 ccs. of methanol, and 4 litres of chlorine measured at N. T. P. were passed into the solution. The reaction mixture was filtered and the filtrate distilled giving 2-methoxy-3, 3-dichlor tetrahydropyran.

Example 3

14.2 grams of the methyl ester of 2,3-dihydropyran-5-carboxylic acid and 60 gms. of calcium carbonate were stirred in 300 mls. of methanol and there was added to the mixture 16 gms. of bromine in methanol solution. Care was taken to keep the temperature of the mixture below 10° C. When the reaction, as judged by bromine absorption, appeared to be complete, the slurry was filtered and the filtrate was evaporated.

There was obtained in 30% yield methoxy-brom-carbmethoxy tetrahydropyran, which had a boiling point of 138° C. at 20 mm. absolute pressure and which, when recrystallised from methanol, had a melting point of 253°-254° C. This is believed to be 2-methoxy-3-brom-3-carbmethoxy tetrahydropyran.

We claim:

1. The process for the production of tetrahydropyran derivatives which comprises reacting a compound from the group consisting of 2,3-dihydropyran, methyl dihydropyran, chlorodihydropyran and 2,3-dihydropyran-5-carboxylic acid with a halogen from the group consisting of chlorine and bromine and with a compound from the group consisting of compounds having the formula ROH and said compounds in which the hydrogen of the hydroxyl group is replaced by an alkali metal wherein, R is from the group consisting of alkyl, aryl, furfuryl, and tetrahydrofurfuryl radicals in the presence of a basic compound which neutralizes the hydrohalide formed during the reaction.

2. The process of claim 1 in which the reaction is carried out at a temperature less than 100° C. under anhydrous conditions.

3. The process for the production of 2-methoxy-3-chlortetrahydropyran which comprises reacting dihydropyran with chlorine and methyl alcohol in the presence of a basic compound which neutralizes the hydrohalide formed during the reaction.

4. The process for the production of 2-methoxy-3-brom-3-carbmethoxy-tetrahydropyran which comprises reacting the methyl ester of 2,3-dihydropyran-5-carboxylic acid with bromine and methyl alcohol in the presence of a basic compound which neutralizes the hydrohalide formed during the reaction.

5. The process for the production of 5-methyl-2-methoxy-3-chlortetrahydropyran which comprises reacting methyl dihydropyran with chlorine and methyl alcohol in the presence of a basic compound which neutralizes the hydrahalide formed during the reaction.

6. New tetrahydropyran derivatives of the formula

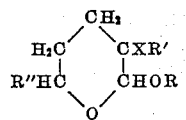

wherein R is a radical from the group consisting of —CH₃, —C₆H₅,

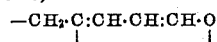

and

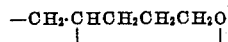

R' is a radical from the group consisting of —Br, —Cl, and —COOCH₃; R'' is a radical from the group consisting of —H and —CH₃, and X is a radical from the group consisting of —Br and —Cl.

7. As a new chemical compound 2-methoxy-3-chlortetrahydropyran.

8. As a new chemical compound 2-methoxy-3-brom 3-carbmethoxy-tetrahydropyran.

9. As a new chemical compound 5-methyl 2-methoxy-3-chlortetrahydropyran.

DAVID GWYN JONES.
JOHN GEORGE MACKAY BREMER.

REFERENCES CITED

The following references are of record in the file of this patent:

Paul, Bull. Soc. Chem. 5, 1397 (1934).
West et al., J. Biol. Chem. 122, 605 (1938).